Feb. 13, 1968

P. PUXKANDL 3,368,419

SELF-ADJUSTING TRANSMISSION FOR TILTABLE
METALLURGICAL FURNACES

Filed Jan. 6, 1965

INVENTOR
PETER PUXKANDL
BY
Brumbaugh, Free, Graves & Donohue

HIS ATTORNEYS

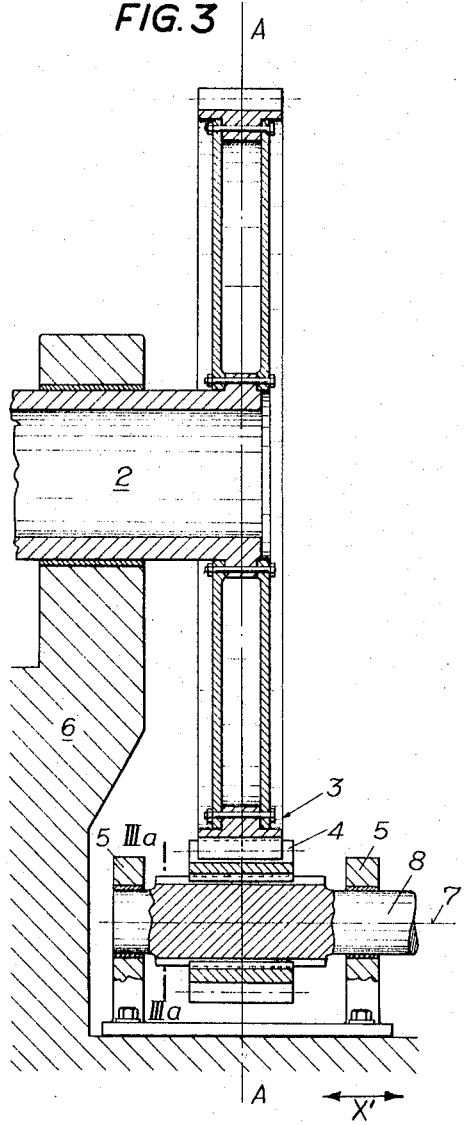
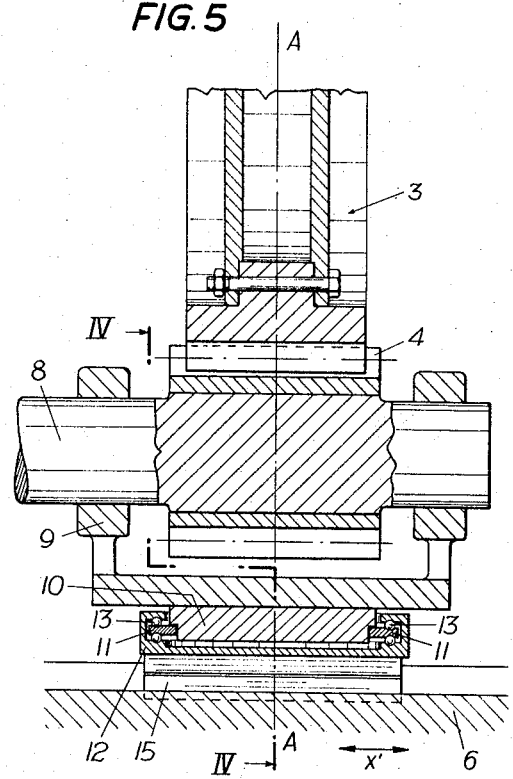
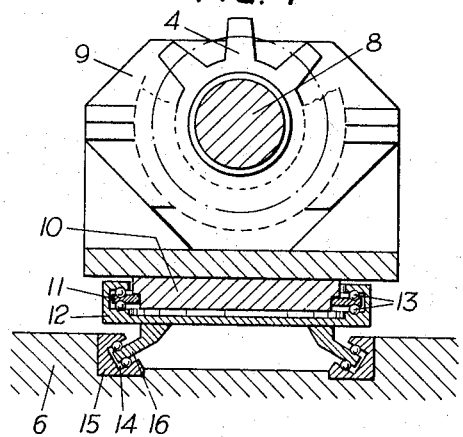
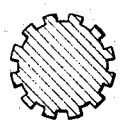

INVENTOR
PETER PUXKANDL
BY

HIS ATTORNEYS

United States Patent Office 3,368,419
Patented Feb. 13, 1968

3,368,419
SELF-ADJUSTING TRANSMISSION FOR TILT-
ABLE METALLURGICAL FURNACES
Peter Puxkandl, Linz, Austria, assignor to firm Vereinigte
Osterreichische Eisen- und Stahlwerke Aktiengesell-
schaft, Linz, Austria, a company of Austria
Filed Jan. 6, 1965, Ser. No. 423,703
Claims priority, application Austria, Jan. 13, 1964,
A 216/64
3 Claims. (Cl. 74—401)

ABSTRACT OF THE DISCLOSURE

The invention relates to a transmission for tiltable crucibles, converters and the like, including a gear fixed to a trunnion on the crucible or converter and a drive pinion which is capable of endwise displacement and rotation about an axis generally perpendicuar to the axis of the gear and to the axis of the trunnion to enable the pinion to remain in proper mesh with the gear on the trunnion during wobbling movement of the trunnion gear.

The invention relates to a self-adjusting transmission for tiltable metallurgical funaces, such as crucibles or converters, which comprises a gear firmly secured to the trunnion of the metallurgical furnace and a pinion in mesh with the gear or with an idler operatively connected to the gear, said pinion being mounted on the frame or platform of the furnace.

Transmissions for tiltable furnaces consisted originally of a pinion which was firmly mounted on the trunnion and a hydraulically operated rack in mesh with the pinion. Electromagnetic tilting drives were subsequently used, in which a gear was also firmly mounted on the trunnion and in mesh with a pinion mounted on the furnace platform. Such drives have proved highly satisfactory with relatively small converters. Difficulties arose, however, when the increasing size of the converters necessitated a replacement of simple gears having straight teeth by herringbone gears because thermal expansion may cause a relative displacement of the gear and pinion or idlers and such a relative displacement would be detrimental to the transmission and contribute to a premature destruction thereof. In the known design, the transmission of vibration from the blowing converter through the gear has had detrimental results for the transmission, for instance, because that tooth of the gear which is always engaged in the vertical blowing position was prematurely destroyed.

It is an object of the present invention to avoid the described disadvantages and difficulties and to provide for metallurgical furnaces a self-adjusting transmission which can follow any relative displacement caused by thermal expansion, distortion, deflection and vibration without impairing the exact mesh between the gear, any idlers and the pinion, and in which herringbone gears can be used rather than gears having straight teeth.

According to the invention this object is accomplished in that the pinion is supported by a mounting which is displaceable at right angles to the tilting plane and preferably rotatable about the longitudinal axis of the self-adjusting transmission so that the pinion can follow a wobbling motion of the trunnion and of the transmission members firmly connected to said trunnion.

The pinion shaft may be displaceably mounted in bearing brackets. The pinion and the bearing bracket are preferably slidable on rails and suitably guided on the rails by balls, rollers or the like. The pinion and bearing bracket are suitably rotatably mounted in a bearing ring, which is inserted in the foundation and has a guiding groove, which receives noses or the like provided on the base of the bearing bracket. The arrangement of the sliding means and of the rotation means may also be opposite, that is to say, the pinion and the bearing bracket may be mounted to be rotatable on a suitable support, e.g. a revolving table, which may be displaceable on rails provided in the foundation.

Figure 1:
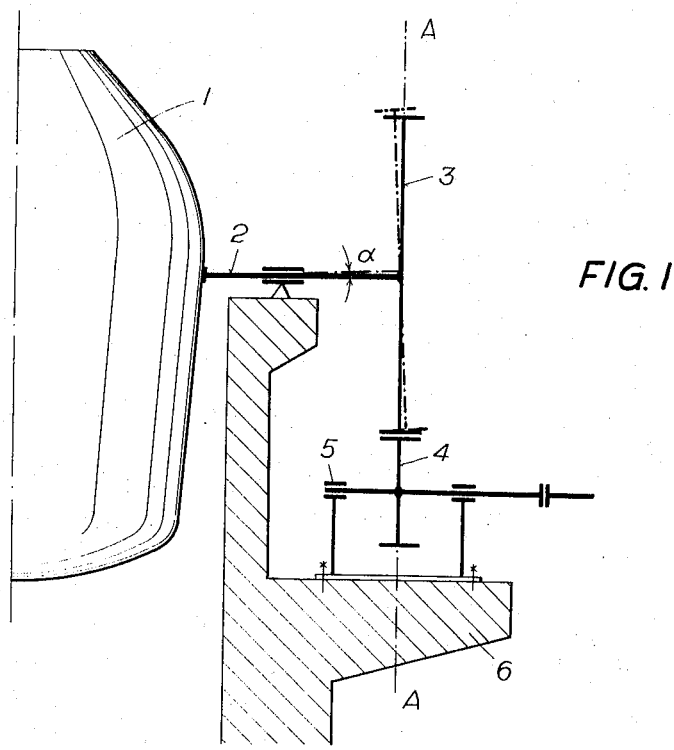
Figure 1A:
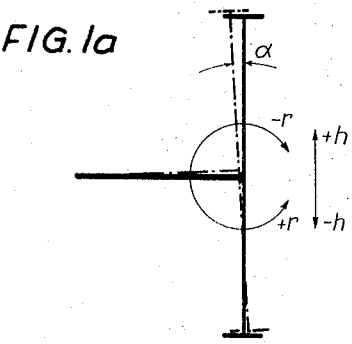
Figure 2A:
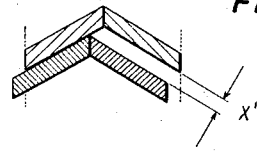
Figure 2:
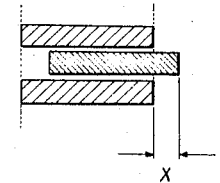
Figure 6:
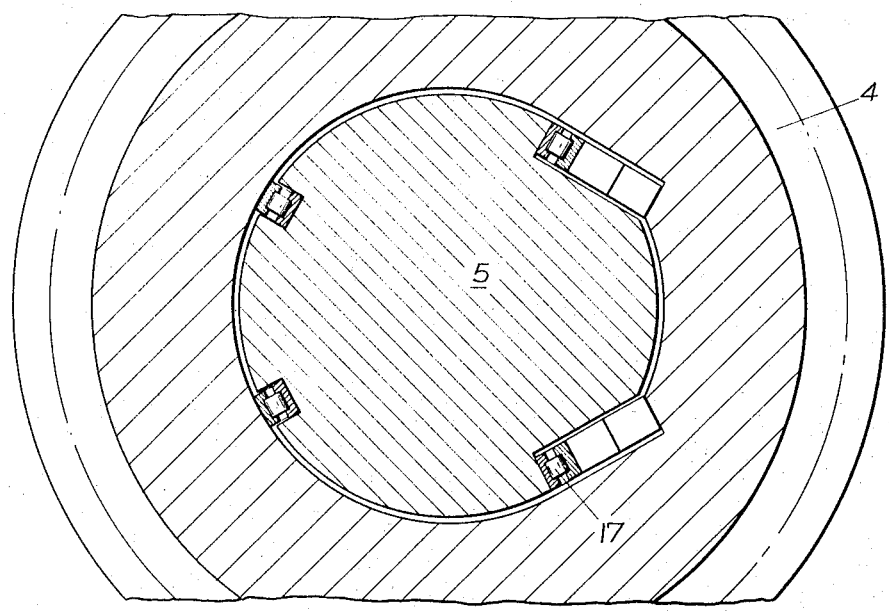

The subject matter of the invention and its function will be explained more fully hereinafter in the accompanying drawing and the subsequent description. FIGS. 1 and 1a illustrate the relative movements between a gear rigidly secured to a trunnion and a pinion secured to the furnace platform. FIGS. 2 and 2a show such a relative movement in one direction for a gear having straight teeth and a herringbone gear, FIG. 3 shows an embodiment of the invention in which relative displacements are taken up only in one direction, at right angles to the tilting plane. FIG. 3a is a section viewed along line IIIa—IIIa of FIG. 3. FIGS. 4, 5 and 6 show a preferred embodiment of the invention for taking up a relative displacement and a relative rotation and for following a wobbling motion of the trunnion and the transmission members firmly connected to the trunnion.

FIGS. 1 and 1a show diagrammatically a top-blowing crucible 1, a trunnion axis 2, a spur gear 3 firmly mounted on the trunnion, a pinion 4, a pinion bearing 5, and a furnace platform 6. Dotted lines indicate the relative movements of the gear and pinion. A conical wobbling movement of the trunnion results in an orbiting deflection of the spur gear about half the included angle $\alpha$. This orbiting deflection results in a reciprocating movement $\pm h$ and a rotational movement $\pm r$ of the meshing teeth. In the known transmissions having straight teeth, the rotational movement $\pm r$ was taken up by the backlash between the teeth. The reciprocating movement $\pm h$ causes a rolling movement, which does not result in an unpermissible or detrimental stress on the teeth. However, there is also a longitudinal movement between the meshing teeth. In the case of the straight teeth shown in FIG. 2, this longitudinal movement results in the displacement $x$. As this displacement is not significant in relation to the force-transmitting surfaces, it may be tolerated in the case of wheels having straight teeth. A different situation is encountered, however, with herringbone wheels, such as are shown in FIG. 2a. In this case, the displacement $x'$ causes a disengagement and dangerous stresses on the transmission.

When it is desired to take the relative movement illustrated in FIGS. 1 and 2 into account and to avoid detrimental results on the transmission, the latter must at least enable the pinion to follow the displacement $x'$ at any time. When it is desired to eliminate also the rotation $\pm r$ compensated by the tooth backlash, as is preferable, the pinion and its mounting must also be rotatable about the longitudinal axis A—A of the transmission. The rolling movement $\pm h$ is still harmless and results only in a theoretical inaccuracy of the side backlash at the pitch circles.

FIG. 3 shows an embodiment in which the displacement $x'$ at right angles to the tilting plane of the crucible is compensated. The gear 3 is firmly mounted on the trunnion 2 and is in mesh with a pinion 4, which is mounted in bearings 5 on the foundation 6. According to the invention, the pinion is slidable or displaceable along its shaft axis 7, at right angles to the tilting plane. To this end, the pinion shaft 8 is mounted in known manner by fixed and loose bearings in the bearing brackets 5. During a wobbling movement of the herringbone gear, the slidable pinion can always adjust itself into exact mesh.

FIGS. 4 and 5 show the preferred embodiment of the invention. In this embodiment, both the longitudinal displacement $x'$ and the rotational movement $\pm r$ are compensated. In this design, the pinion 4 is mounted in the bearing bracket 9, which is displaceable and rotatable together with the pinion relative to the foundation 6.

The rotatability about the longitudinal axis A—A is enabled because the base 10 of the bearing bracket has laterally protruding annular flanges 11, which are guided and supported by a channel-shaped guiding member 12 with the aid of key elements 13, which consist preferably of balls, rollers or the like. Instead of the arrangement described in connection with this embodiment and enabling a rotation of the pinion about the axis A—A, any other arrangement, known per se, may be used.

In addition a longitudinal displacement is provided for in that the whole assembly, comprising pinion 4 with bearing bracket 9, the base 10 of this bracket and the guiding member 12, is guided by rails 15 formed with guiding grooves 14 and inserted in the foundation 6. By means of noses 16, the guiding member 12 is supported and guided in the guiding groove 14. In this embodiment, the said sliding arrangement enabling a displacement of the bearing bracket and the pinion by the distance $x'$ may be replaced by another sliding arrangement known per se. The sliding arrangement and rotational arrangement shown are non-tiltable.

Figure 7:
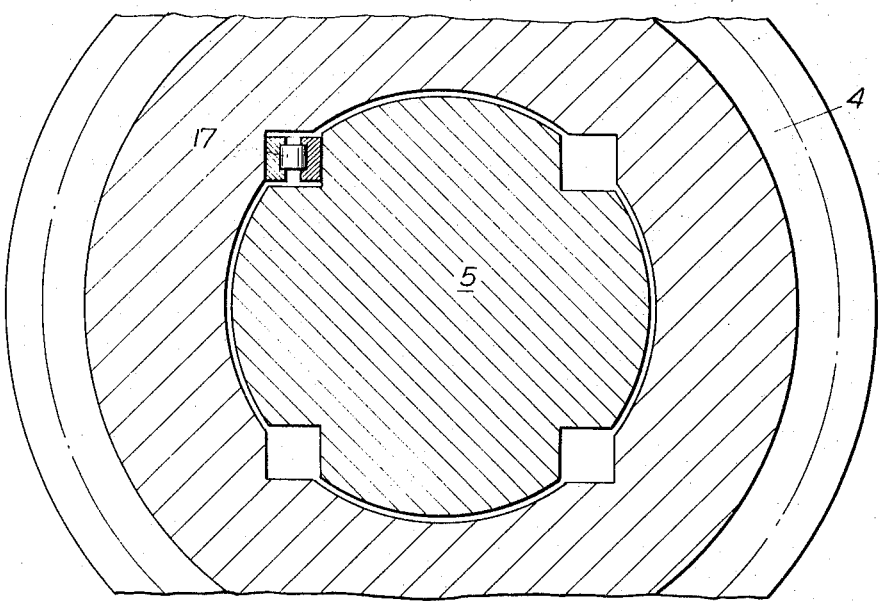

FIGS. 6 and 7 show torque-transmitting joints between shafts and hubs. In accordance with the showing of FIG. 3, these joints comprise displaceable elements for taking up torque. These elements consist of roller keys 17 and are mainly used when a displacement of the pinion of FIG. 3 would be difficult owing to an excessive friction.

According to another feature of the self-adjusting transmission according to the invention, the material of the spur pinion may be softer than that of the spur gear. This feature affords additional protection against the detrimental results of a transmission of vibration from the blowing converter to the transmission. Owing to the fact that this vibration occurs during a much longer time than the stressing of the transmission by the tilting operation—in a usual refining operation the blowing time is, e.g., 25 minutes and the tilting operation during the charging of crude iron and scrap and the discharging is only ¼ to ⅕ of this time—such an additional protection appears to be desirable for the purposes of the invention. Whereas the spur gear on the trunnion cannot be rotationally adjusted because keys as well as fitting screws will be effective only in one position, the pinion can be re-adjusted without difficulty by one or more teeth from time to time.

Bearing in mind that the gear is the heaviest part of the transmission, the use of a softer material for the pinion than for the gear prevents a premature wear of that tooth of the gear which is engaged in the blowing position and causes any differential wear to be restricted to the pinion, which can be re-adjusted. According to this additional feature of the invention it is sufficient to check the pinion from time to time and to re-adjust it when the first signs of wear become apparent, until all teeth of the pinion are uniformly worn. From the economic aspect, the replacement of the pinion as a wearing part is particularly simple and inexpensive when the design shown in FIG. 3. is used in combination with those of FIGS. 6 and 7. In this case the shaft and bearings need not be replaced.

What I claim is:
1. A self-adjusting transmission for a tiltable metallurgical furnace having a trunnion supporting said furnace on a platform for tilting movement in a plane, comprising a gear fixed to said trunnion, a bearing bracket mounted on said platform, a pinion shaft rotatably mounted in said bracket, a pinion on said pinion shaft operatively connected with said gear and displaceable at substantially a right angle to the plane of tilting of said furnace and rotatable about an axis substantially perpendicular to the axis of said trunnion and the axis of said pinion shaft, said displacement and rotation of said pinion around said substantially perpendicular axis enabling said pinion to follow wobbling motions of said trunnion and said gear.

2. A self-adjusting transmission for tiltable metallurgical furnaces, which comprises a gear firmly secured to the trunnion of the metallurgical furnace and a pinion mounted on the platform of said furnace and operatively connected with said gear, said pinion being supported by a mounting which is displaceable at right angles to the tilting plane and rotatable about the longitudinal axis of the self-adjusting transmission so as to be capable of following a wobbling motion of the trunnion and of the transmission members firmly connected to said trunnion, the shaft of said pinion being displaceably mounted in a bearing bracket, said pinion and its bearing bracket being mounted to be rotatable on a revolving table displaceable on rails provided in said furnace platform.

3. A self-adjusting transmission for tiltable metallurgical furnaces, which comprises a gear firmly connected to the trunnion of the metallurgical furnace and a pinion mounted on the platform of said furnace and operatively connected with said gear, said pinion being supported by a mounting displaceable at right angles to the tilting plane and rotatable about the longitudinal axis of the self-adjusting transmission so as to be capable of following a wobbling motion of the trunnion and of the transmission members firmly connected to said trunnion, the shaft of said pinion being displaceably mounted in a bearing bracket, said pinion and its bearing bracket being mounted to be slidable on rail members and the assembly comprising said pinion and its bearing bracket and said rail members being rotatably mounted in a bearing ring which is inserted in said furnace platform.

References Cited
UNITED STATES PATENTS

| 1,475,468 | 11/1923 | Armstrong | 74—410 |
| 1,502,199 | 7/1924 | Hodgkinson | 74—410 |
| 2,337,501 | 12/1943 | Schmidt | 74—410 |
| 2,483,017 | 9/1949 | McFeaters | 74—425 |
| 3,011,393 | 12/1961 | Kotte | 74—411 |
| 3,207,002 | 9/1965 | Lakin et al. | 74—411 |
| 3,241,387 | 3/1966 | Puhringer | 74—411 |

FRED C. MATTERN, JR, *Primary Examiner.*

DAVID J. WILLIAMOWSKY, *Examiner.*

C. J. HUSAR, *Assistant Examiner.*